Figure 1:
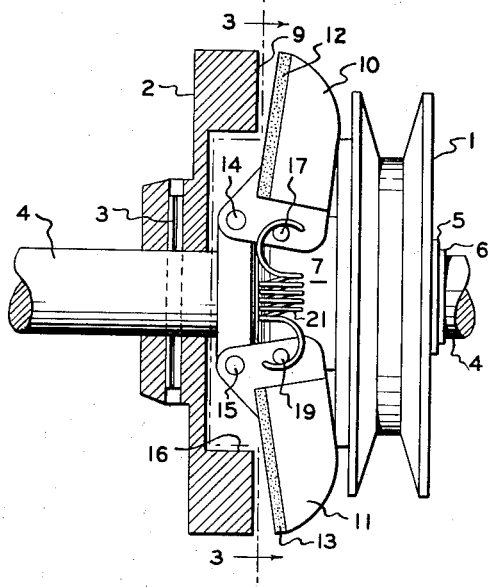

Feb. 5, 1957     J. R. HUBBARD     2,780,335
CENTRIFUGAL MOTOR PROTECTION CLUTCH
Filed Oct. 15, 1954

*INVENTOR.*
JAMES R. HUBBARD
BY
HIS ATTORNEY

United States Patent Office 2,780,335
Patented Feb. 5, 1957

2,780,335

CENTRIFUGAL MOTOR PROTECTION CLUTCH

James R. Hubbard, Allentown, N. J., assignor to General Electric Company, a corporation of New York Application October 15, 1954, Serial No. 462,498

1 Claim. (Cl. 192—105)

This invention relates to centrifugally operated clutches engaged responsive to speed of rotation.

The alternating current induction motor is used as the power source for driving many types of devices and appliances, because of its many desirable characteristics. However, such motors generally have a speed-torque characteristic such that maximum torque results at a speed approaching top speed; yhile at lower speeds the output torque is less. Thus it is unsatisfactory to start a motor of this type under a heavy load since it may never reach running speed. For example, in the drive of a centrifugal extractor type domestic washing machine, an automatic clutch is required to relieve or limit the load on the motor at slow speeds, while providing full driving torque in the speed range for which the motor is designed.

It is therefore an object of this invention to provide an improved clutch having an engaging force responsive to speed of rotation, for example to provide automatic overload protection for an electric motor.

Further objects of this invention include constructing a centrifugal overload protection clutch having maximum clutch face area in a compact design featuring low manufacturing cost and high reliability.

Still another object of this invention is to provide a centrifugally operated friction clutch which is self-cleaning, and which is not adversely affected by the presence of particles of dirt or foreign matter.

In accordance with the illustrated embodiment of this invention, the driving and driven members of the clutch are coaxially mounted for rotation, the driven member being keyed to the output shaft. A clutch face on the driven member is perpendicular to the axis of rotation and is adjacent the driving member. Centrifugally operated clutch weights are pivotally mounted on the driving member, having clutch faces thereon engageable with the driven member clutch face upon rotation of said driving member. To maintain the clutch disengaged in the low speed range, a spring or equivalent biasing device is employed between the weights or between each weight and the driving member.

Figure 3:
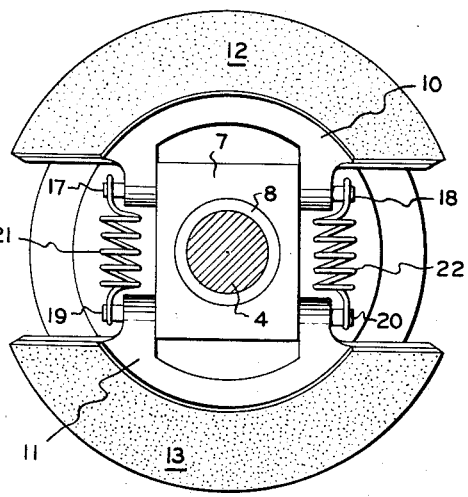
Figure 2:
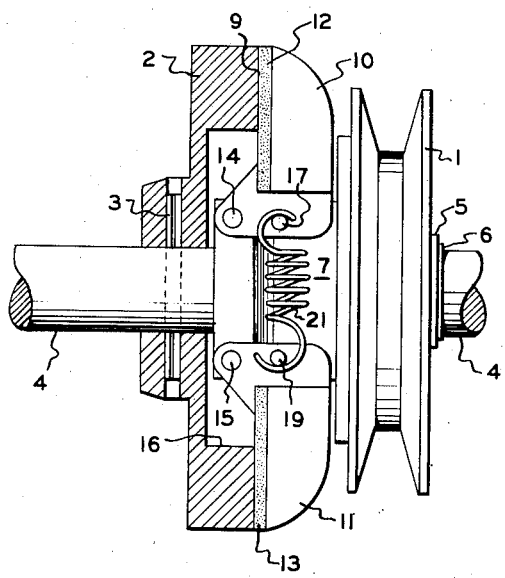

The features of my invention which I believe to be novel are set forth with particularity in the appended claim. My invention itself, however, both as to its organization and method of operation, together with further objects and advantages thereof, may best be understood by reference to the following description taken in connection with the accompanying drawing, in which Fig. 1 is a front elevation, partially in section through a centrifugally operated overload clutch in accordance with this invention;

Fig. 2 is a front elevation partially in section similar to Fig. 1, but with the components in a different operating position; and Fig. 3 is a cross-sectional view taken on the lines 3—3 of Fig. 1 looking in the direction of the arrows.

Referring to the drawing, this clutch is illustrated as having a driving member 1 and a driven member 2. The driven member is shown as keyed by a means such as 3 to an output shaft 4. If desired, the input driving member 1 may take the form of a V-pulley adapted to be connected with a motor or other driving source through a V belt (not shown). Driving member 1 and driven member 2 are shown mounted on the same shaft 4, although it becomes obvious that the driving member could be carried by its own independent input shaft, subject to the requirement that both the input and the output members rotate on the same axis. In the embodiment illustrated, input driving member 1 is journaled on shaft 4 so that it may rotate freely with respect thereto. It is held in proper axial position on the shaft by a thrust washer 5 and appropriate retainer 6. Therefore, input driving member 1 may be rotated without transmission of any appreciable torque to the driven member 2 or output shaft 4.

As shown in Fig. 3, the input driving member is formed with a hub 7 of generally rectangular configuration, although the exact shape of this hub is not an essential part of this invention. Extending through both the hub and the pulley 1 is an internal bushing 8 of appropriate bearing material for receiving shaft 4.

The driven member 2 of the clutch is machined or otherwise formed to provide a clutch face 9 in a plane perpendicular to the rotational axis. A pair of clutch weight members 10 and 11 are pivotally mounted to hub 7 of the driving member so that they may move between the retracted positions shown by Fig. 1 and the engaged position shown by Fig. 2. Each of these weights has a clutch facing, elements 12 and 13 respectively, adapted to cooperate with the friction or clutch facing 9 on driven member 2. In the particular arrangement shown herein, a pair of pivot pins 14 and 15 are secured in hub 7 of the driving member on which the weight members 10 and 11 respectively are mounted. To provide the proper relationship with respect to the pivotal axis of the weight members, their centers of gravity, and the required operational position when the clutch is engaged, the hub extends axially into a recessed area 16 in the driven member. Thus, the pivotal axis of each of the weights is located to the left of the clutch face 9. The center of gravity of each of the weight members on the other hand is located to the right of clutch face 9; and therefore, when the input member is rotated, carrying with it weights 10 and 11, each weight tends to pivot about its axis to the clutch engaged position shown by Fig. 2. Obviously, the more rapidly the clutch is rotated the greater is the clutch engaging force.

For most applications, it is desirable that the clutch not engage until a certain operational speed is reached. To provide this feature of the operation, a suitable means is provided for biasing each of the clutch weights to the disengaged position. In the illustrated embodiment, this is accomplished by providing projecting pins 17 and 18 on clutch weight 10 and similar pins 19 and 20 projecting from clutch weight 11. A tension spring 21 extends between pins 17 and 19, while a similar tension spring 22 extends between pins 18 and 20. Thus as clearly shown in Fig. 1, these tension springs exert forces on the clutch weights tending to retract them with respect to clutch face 9.

In operation of this device, the initial rotation of driving member 1 does not result in the closure of the clutch or in any appreciable driving effort through the clutch inasmuch as springs 21 and 22 maintain the clutch weights out of engagement with the clutch face on the driven member. As the desired operating speed is approached, the centrifugal force acting on the weights in a direction displaced from their pivotal axis results in a turning moment acting on each weight to rotate it about its pivotal axis to a clutch engaged position. This engaging force increases as a function of the square of the rotational speed, If at any time, due to a sudden increase in the load driven by output shaft 4, the speed of rotation of the assembly drops, the centrifugal clutch functions to permit sufficient slip between member 1 and driven member 2 so that the driving motor is not overloaded. Since the clutch faces in the arrangement shown extend radially, any foreign particles which might otherwise tend to lodge between the faces are thrown outwardly during the initial rotation. Furthermore, particles of dust and the like resulting from wear between the mating frictional surfaces 9, 12 and 13 are likewise thrown outwardly and clear of the clutch faces. Thus, a clutch of this type is self-cleaning. In addition, this face type clutch, for a given size or space limitation, provides a high driving force since a substantial area of frictional engagement is provided at a large average radius.

While this invention has been described by reference to a particular embodiment thereof, it is to be understood that numerous modifications may be made by those skilled in the art without actually departing from the invention. It is therefore the aim of the appended claim to cover all such equivalent variations as come within the true spirit and scope of the invention.

What I claim as new and desire to secure by Letters Patent of the United States is:

In a centrifugal overload protection clutch, a shaft, a driving member rotatably journaled and axially restrained on said shaft, a driven member fixed on said shaft said driven member having a frictional type clutch face in a plane perpendicular to the shaft axis adjacent said driving member and including a recess behind the plane of said clutch face and radially inward of said face, a hub on said driving member extending toward said driven member and into said recess, a pair of clutch weights each having a face adapted to cooperate with the clutch face on said driven member, an arm fixed to each of said weights and extending in a generally axial direction, means pivotally securing the remote end of each arm to the portion of said hub within said recess, whereby centrifugal force acting on said weights pivots said weights on said hub to engage the clutch faces thereof with the clutch face on said driven member, and resilient means acting to pivot said weights to a clutch disengaged position.

References Cited in the file of this patent

UNITED STATES PATENTS

| | | |
|---|---|---|
| 729,845 | Cherry | June 2, 1903 |
| 1,860,010 | Bourquim | May 24, 1932 |
| 1,920,579 | Mock | Aug. 1, 1933 |